(12) United States Patent
Michiels et al.

(10) Patent No.: US 12,707,118 B2
(45) Date of Patent: Aug. 11, 2026

(54) SERVER-SIDE STREAMING CONTENT STITCHING

(71) Applicant: ROKU, INC., San Jose, CA (US)

(72) Inventors: Wim Michiels, San Jose, CA (US); David Allen Westerhoff, Pleasanton, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/895,525

(22) Filed: Sep. 25, 2024

(65) Prior Publication Data

US 2025/0016406 A1 Jan. 9, 2025

Related U.S. Application Data

(63) Continuation of application No. 17/835,337, filed on Jun. 8, 2022, now Pat. No. 12,126,859, which is a (Continued)

(51) Int. Cl.

| | |
|---|---|
| ***H04N 21/44*** | (2011.01) |
| ***H04N 21/43*** | (2011.01) |
| ***H04N 21/439*** | (2011.01) |

(52) U.S. Cl.

CPC . *H04N 21/44016* (2013.01); *H04N 21/43072* (2020.08); *H04N 21/4394* (2013.01); *H04N 21/44008* (2013.01)

(58) Field of Classification Search

CPC ....... H04N 21/44016; H04N 21/43072; H04N 21/4394; H04N 21/44008; H04N 21/4302;

(Continued)

(56) References Cited

U.S. PATENT DOCUMENTS

| | | |
|---|---|---|
| 6,865,339 B1 | 3/2005 | Gable et al. |
| 8,732,745 B2 | 5/2014 | McCoy et al. |

(Continued)

FOREIGN PATENT DOCUMENTS

| | | |
|---|---|---|
| CN | 105704508 A | 6/2016 |
| GB | 2543080 A | 4/2017 |

(Continued)

OTHER PUBLICATIONS

International Search Report and Written Opinion of the International Searching Authority directed to related International Patent Application No. PCT/US2019/028893, mailed Sep. 24, 2019; 11 pages.

(Continued)

*Primary Examiner* — Michael R Telan

(74) *Attorney, Agent, or Firm* — Sterne, Kessler, Goldstein & Fox P.L.L.C.

(57) ABSTRACT

Disclosed herein are various embodiments for server-side scene change content stitching. An example embodiment operates by providing first content for display on a display device. A point in a timeline of the first content when second content is to be displayed is identified. A scene change in the first content closest to the point in the timeline is identified. A first frame having a distance X prior to the scene change is identified, and the first content for display. The second content is provided for display on the display device beginning at the scene change. At a conclusion of the second content, the display is paused, and seeking and decoding the first content to the scene change by decoding the first content to the identified first frame plus the distance X is performed. The decoded first content, from the scene change, is provided to the display device for display.

20 Claims, 12 Drawing Sheets

Related U.S. Application Data continuation of application No. 17/405,902, filed on Aug. 18, 2021, now Pat. No. 11,388,474, which is a continuation of application No. 15/962,030, filed on Apr. 25, 2018, now Pat. No. 11,128,914.

(58) Field of Classification Search
CPC ........... H04N 21/4622; H04N 21/6112; H04N 21/6125
See application file for complete search history.

(56) References Cited

U.S. PATENT DOCUMENTS 9,781,188 B2 10/2017 Lee et al.
11,128,914 B2 9/2021 Michiels et al.
11,388,474 B2 7/2022 Michiels et al.
2002/0083469 A1 6/2002 Jeannin et al.
2002/0194595 A1* 12/2002 Miller ................ H04N 21/4542 348/E7.083
2002/0196850 A1 12/2002 Liu et al.
2003/0071971 A1* 4/2003 Jo ........................ G11B 27/327 386/E5.052
2005/0002644 A1 1/2005 Nakamura et al.
2008/0046919 A1 2/2008 Carmi et al.
2008/0276266 A1* 11/2008 Huchital ............ H04N 21/8133 725/32
2009/0265737 A1 10/2009 Issa et al.
2009/0300145 A1 12/2009 Musayev et al.
2010/0231791 A1* 9/2010 Prestenback ............. H04N 5/76 348/565
2010/0254673 A1 10/2010 Begen et al.
2012/0311649 A1 12/2012 Patten et al.
2014/0003791 A1 1/2014 Barton et al.
2014/0068695 A1 3/2014 Shelton et al.
2014/0259048 A1 9/2014 Brueck et al.
2015/0150046 A1 5/2015 Maharajh et al.
2016/0191971 A1* 6/2016 Benitez .............. H04N 21/8456 725/34
2018/0295415 A1* 10/2018 Roujansky ....... H04N 21/44016
2019/0335231 A1 10/2019 Michiels et al.
2021/0385532 A1 12/2021 Michiels et al.
2022/0303617 A1 9/2022 Michiels et al.

FOREIGN PATENT DOCUMENTS

JP 5651225 B2 1/2015
WO WO 0019726 A1 4/2000
WO WO 2017015284 A1 1/2017

OTHER PUBLICATIONS

International Preliminary Report on Patentability directed to related International Patent Application No. PCT/US2019/028893, mailed Oct. 10, 2020; 7 pages.

Supplementary Partial European Search Report directed to related European Application No. 19793250.2, mailed on Jan. 3, 2022; 15 pages.

European Search Report directed to related European Application No. 19793250.2, mailed on May 16, 2022; 19 pages.

* cited by examiner

SERVER-SIDE STREAMING CONTENT STITCHING

CROSS-REFERENCE TO RELATED APPLICATIONS

The application is a continuation of U.S. patent application Ser. No. 17/835,337, titled "Server-Side Streaming Content Stitching,", filed on Jun. 8, 2022 which is a continuation of U.S. patent application Ser. No. 17/405,902, titled "Server-Side Scene Change Content Stitching,", filed on Apr. 22, 2022 which is a continuation of U.S. patent application Ser. No. 15/962,030, titled "Client Side Stitching Of Content Into A Multimedia Stream,", filed on Apr. 25, 2018, all of which are herein incorporated by reference in their entireties.

BACKGROUND

Field

This disclosure is generally directed to media streaming, and more particularly to server side stitching of second content into a stream of first content.

Background

In streaming media applications, it is sometimes desirable to interleave, or stitch, second content into a stream of first content. The first content may be a movie or TV program, for example. The second content may be a public service or upcoming program announcement, for example.

There are various challenges with such stitching operations. For example, when performing stitching, the audio and/or video format of the second content may differ from the first content. The resulting need to switch audio and/or video decoders to accommodate the format of the second content may result in playback discontinuities in the switch over from the first content to the second content (such as an extended blank screen or audio mute). Such discontinuities may degrade the user's viewing experience.

As another example, stitching typically occurs at I frame or IDR frames of the first content. But, I frames and IDR frames are not aligned with scene changes of the first content, unless by happenstance. Thus, stitching in the second content at such non-scene change moments of the first content may be disruptive to and degrade the user's viewing experience.

SUMMARY

Provided herein are system, apparatus, article of manufacture, method and/or computer program product embodiments, and/or combinations and sub-combinations thereof, for stitching second content into a stream of first content, where the audio and/or video format of the first content may differ from the second content.

An example media device embodiment operates by decoding first content using a first decoder compatible with the first content. The decoded first content is displayed on a display device. The media device then receives second content for stitching into the display of the first content. The media device determines whether an audio format and a video format of the second content match an audio format and a video format of the first content. If the audio format and the video format match, then the media device causes a program time stamp (PTS) of the second content to be consecutive with a PTS of the first content during the stitching, such that a reference clock is also consecutive. This provides continuity during the stitching. The media device causes the first decoder to decode the second content, and then displays the decoded second content on the display device using the PTS of the second content and the reference clock.

If the video format matches but the audio format does not match, then the media device causes a video PTS of the second content to be consecutive with a video PTS of the first content during the stitching. The media device causes the first decoder to decode video of the second content, and selects a second decoder compatible with an audio format of the second content. The media device causes the second decoder to decode audio of the second content, sets an audio PTS of the second content to be equal to the video PTS of the second content, and displays the decoded second content on the display device using the audio PTS of the second content, the video PTS of the second content, and the reference clock.

If the video format does not match but the audio format matches, then the media device causes an audio PTS of the second content to be consecutive with an audio PTS of the first content during the stitching, causes the decoder to decode audio of the second content, selects a second decoder compatible with a video format of the second content, causes the second decoder to decode video of the second content, sets a video PTS of the second content to be equal to the audio PTS of the second content and displays the decoded second content on the display device using the audio PTS of the second content, the video PTS of the second content, and the reference clock.

If the video format and audio format do not match, then the media device selects a second decoder compatible with an audio format of the second content, causes the second decoder to decode audio of the second content, selects a third decoder compatible with a video format of the second content, causes the third decoder to decode video of the second content, resets the reference clock, an audio PTS of the second content, and a video PTS of the second content, and displays the decoded second content on the display device using the audio PTS of the second content, the video PTS of the second content, and the reference clock.

Also provided herein are system, apparatus, article of manufacture, method and/or computer program product embodiments, and/or combinations and sub-combinations thereof, for stitching second content into a stream of first content, such that the stitching occurs at scene change boundaries of the first content, using a single audio/video decoder. An example method includes: decoding first content using the audio decoder and the video decoder; displaying the decoded first content on a display device; receiving second content for stitching into display of the first content; playing the decoded first content on the display device to a scene change in the first content; decoding the second content using the audio decoder and the video decoder; displaying the decoded second content on the display device; at a conclusion of the second content, pausing display on the display device; decoding the first content to the scene change using the audio decoder and the video decoder; and resuming display of the decoded first content on the display device.

Further provided herein are system, apparatus, article of manufacture, method and/or computer program product embodiments, and/or combinations and sub-combinations thereof, for stitching second content into a stream of first content, such that the stitching occurs at scene change boundaries of the first content, using multiple audio/video decoders. An example media device includes a memory, a plurality of decoders and a processor, and the processor is configured to: decode first content using a first decoder; display the decoded first content on a display device; receive second content for stitching into display of the first content; play the decoded first content on the display device to a scene change in the first content; decode the second content using a second decoder; display the decoded second content on the display device; at a conclusion of the second content, resume decoding the first content using the first decoder; and resume display of the decoded first content on the display device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
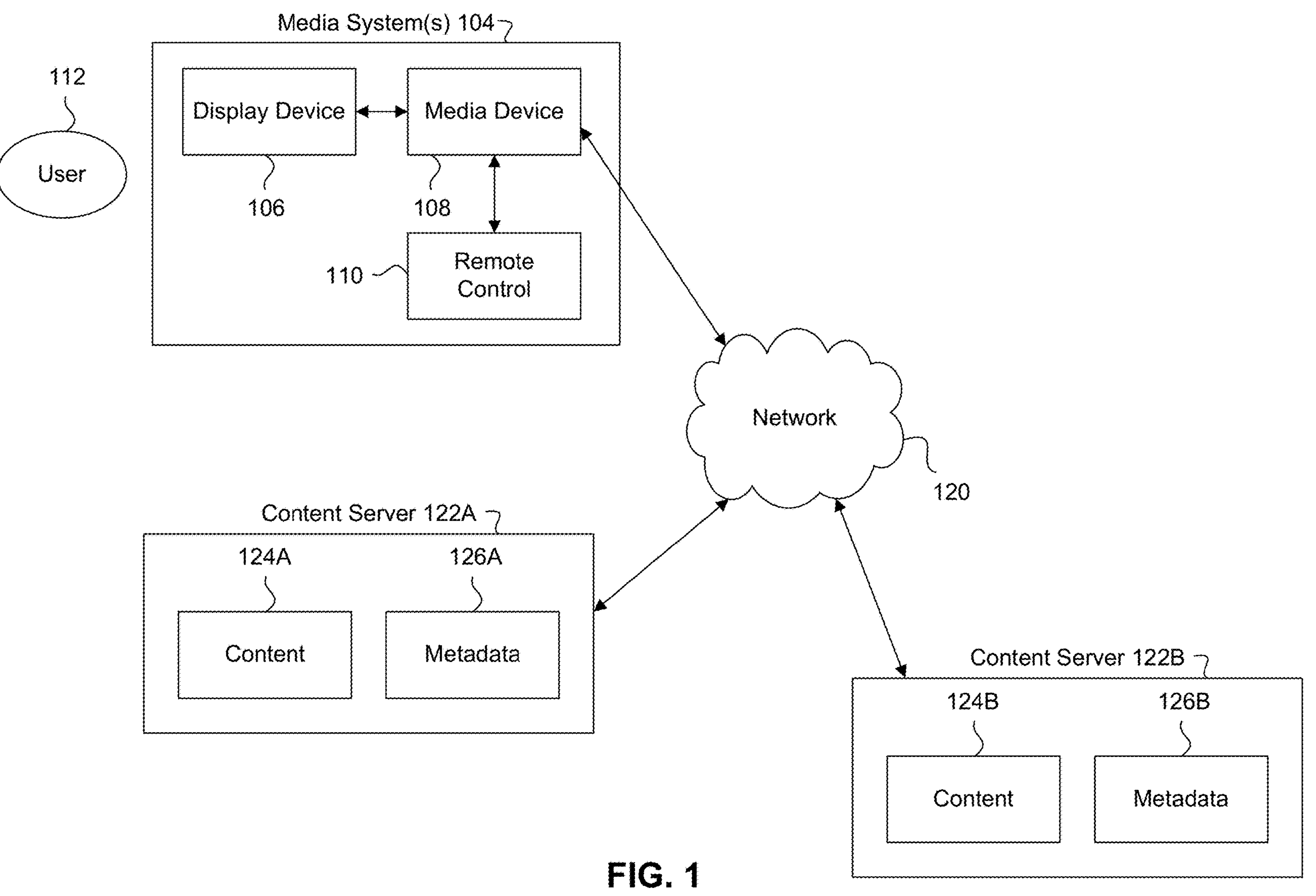
FIG. 1 illustrates a block diagram of a multimedia environment, according to some embodiments.

FIG. 1 illustrates a block diagram of a multimedia environment 102, according to some embodiments. In a non-limiting example, multimedia environment 102 is directed to streaming media.

The multimedia environment 102 may include one or more media systems 104. Each media system 104 may include one or more media devices 108 each coupled to a display device 106. Media device 108 may be a streaming media device, DVD device, audio/video playback device, cable box, and/or digital video recording device, to name just a few examples. Display device 106 may be a monitor, television, computer, smart phone, tablet, wearable (such as a watch), and/or projector, to name just a few examples. In some embodiments, media device 108 can be a part of, integrated with, operatively coupled to, and/or connected to its respective display device 106.

Each media device 108 may be configured to communicate with network 120. In various embodiments, the network 120 can include, without limitation, wired and/or wireless intranet, extranet, Internet, cellular, Bluetooth and/or any other short range, long range, local, regional, global communications network, as well as any combination thereof.

The multimedia environment 102 may include a plurality of content servers 122 (also called content providers 122). Although only two content servers 122 are shown in FIG. 1, in practice the multimedia environment 102 may include any number of content servers 122. Each content server 122 may be configured to communicate with network 120.

Each content server 122 may store content 124 and metadata 126. Content 124 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124, such as but not limited to a trick mode index.

Figure 2:
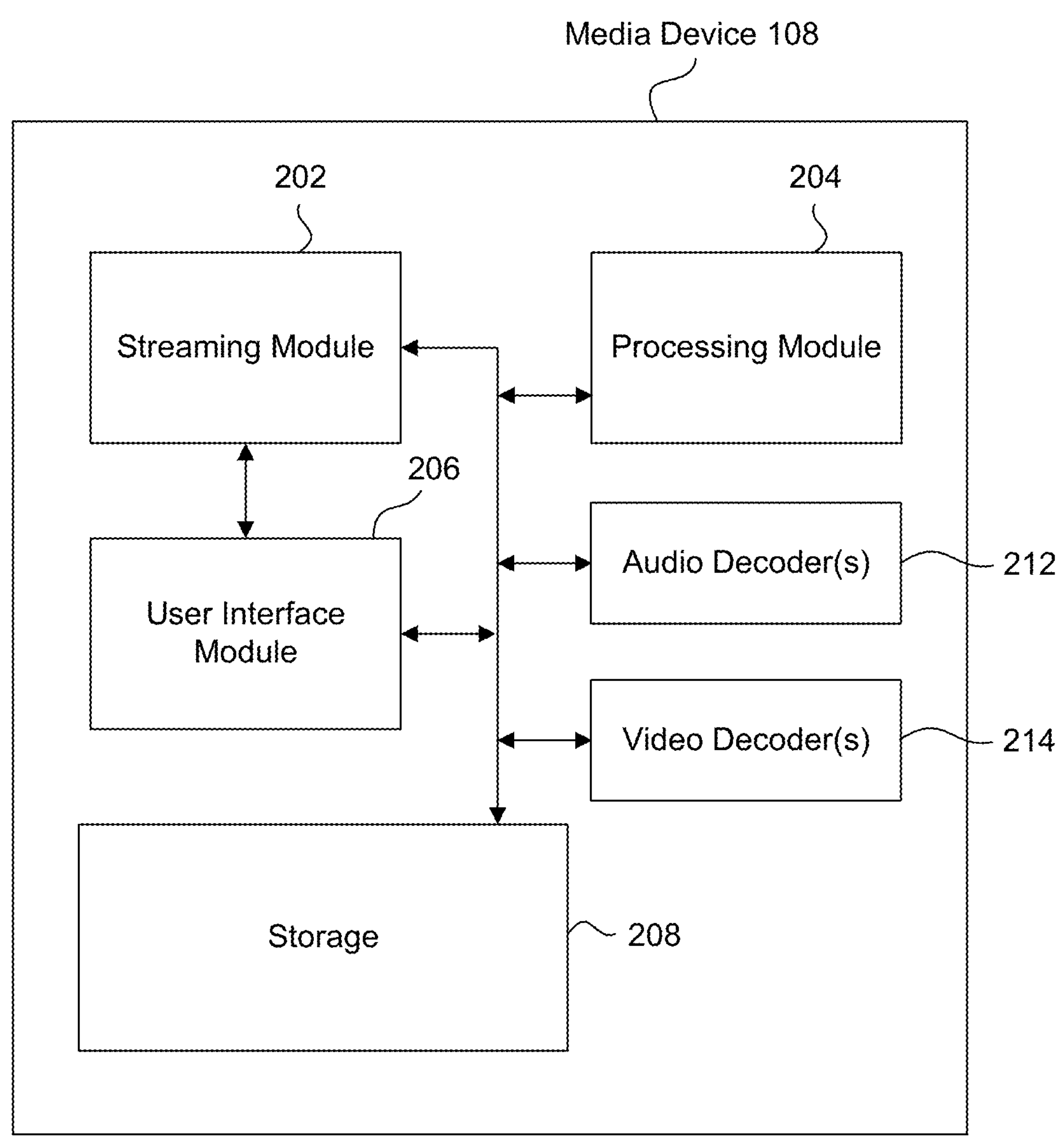
FIG. 2 illustrates a block diagram of a media device, according to some embodiments.

FIG. 2 illustrates a block diagram of an example media device 108, according to some embodiments. Media device 108 may include a streaming module 202, processing module 204, user interface module 206 and storage 208. The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, a user (not shown) at any of the media devices 108 may interact with the media device 108 via, for example, a remote control 110. The remote control 110 can be any component, part, apparatus and/or method for controlling the media device 108 and/or display device 106, such as a remote control, a tablet, laptop computer, smartphone, wearable, on-screen controls, integrated control buttons, audio controls, or any combination thereof, to name just a few examples.

The user may use the remote control 110 to interact with the user interface module 206 of the media device 108 to select content, such as a movie, TV show, music, book, application, game, etc. The streaming module 202 of media device 108 may request the selected content from content server(s) 122 over the network 120. Content server(s) 122 may transmit the requested content to the streaming module 202. Media device 108 may transmit the received content to its associated display device 106 for presentation to the user. In streaming embodiments, the streaming module 202 may transmit the content to display device 106 in real time or near real time as it receives such content from content server(s) 122. In non-streaming embodiments, the media device 108 may store the content received from content server(s) 122 in storage 208 for later playback on display device 106.

Figure 3:
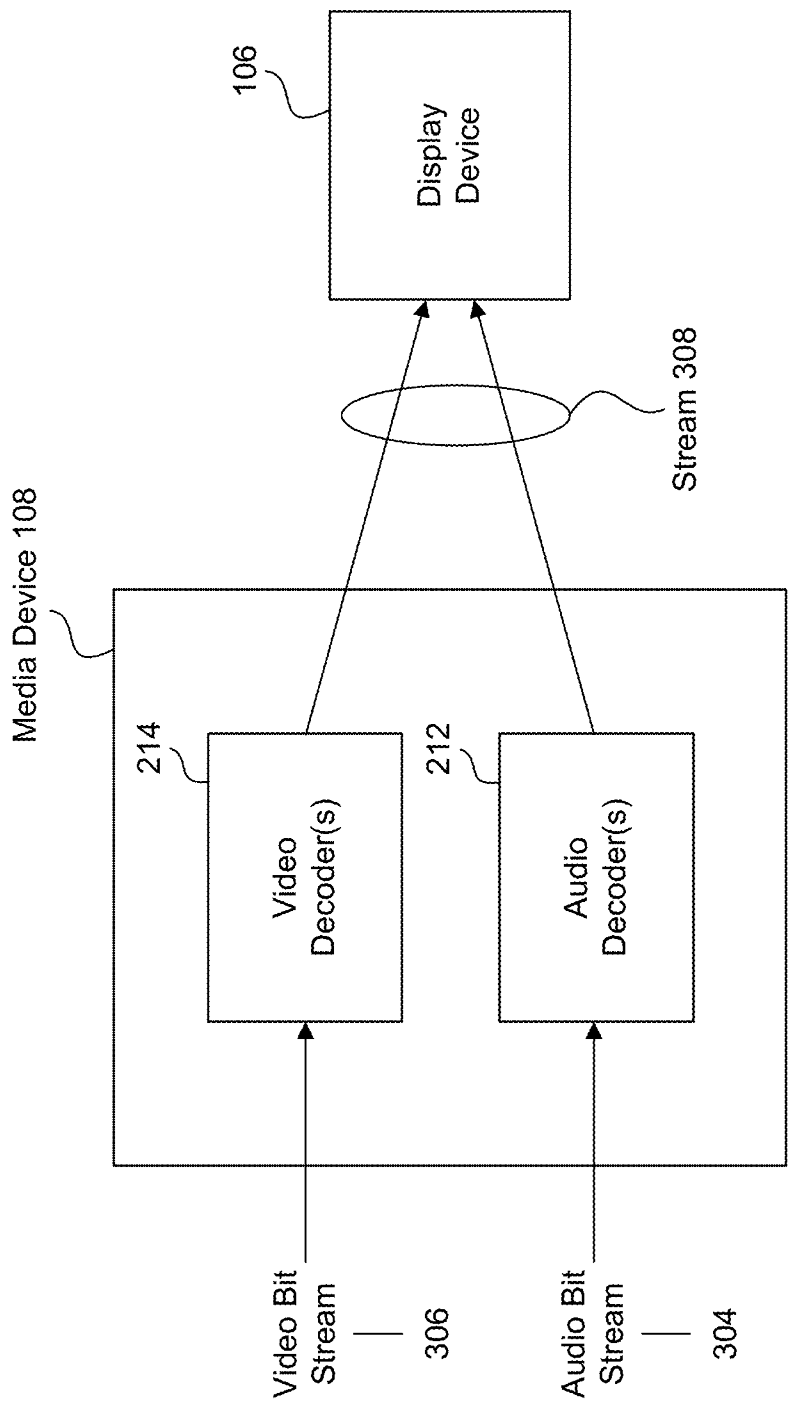
FIG. 3 illustrates operation of audio and video decoders in a media device, according to some embodiments.

FIG. 3 illustrates an example media device 108 and the general operation of the audio decoders 212 and the video decoders 214 therein. As shown, the audio decoders 212 receive an audio bit stream 304 and the video decoders 214 receive a video bit stream 306. The audio bit stream 304 and video bit stream 306 may correspond to a movie, TV show, future programming message, public service or community service announcement, advertisement, or any other content that is being downloaded by the media device 108 from a content server 122. The audio and video decoders 212, 214 decode the audio bit stream 304 and the video bit stream 306, respectively, in a well-known manner to generate a stream 308 (that comprises the decoded audio and video) that is provided to the display device 106 for playback to the user.

Figure 4:
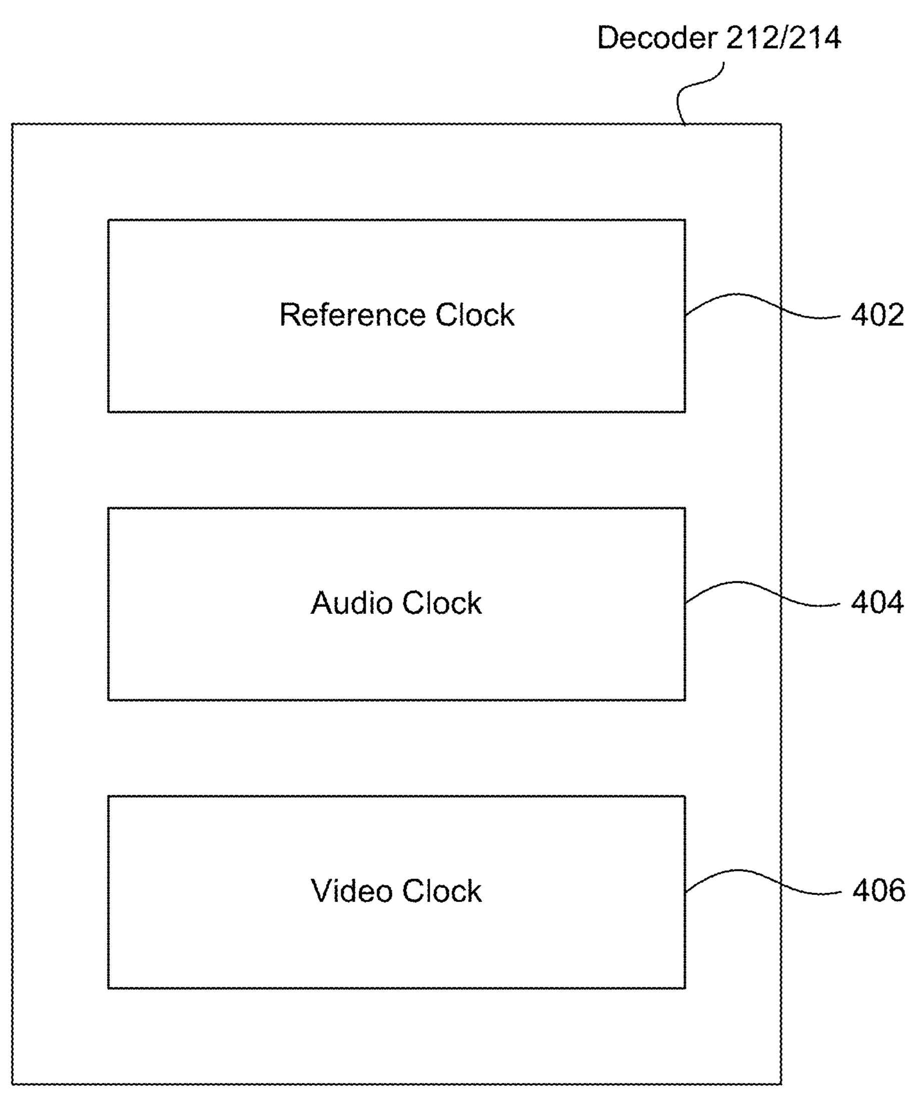
FIG. 4 illustrates clocks associated with an example decoder, according to some embodiments.

FIG. 4 illustrates clocks that may be associated with audio decoders 212 and video decoders 214, according to some embodiments. The clocks may include a reference clock 402, an audio clock 404 and/or a video clock 406. In some embodiments, an audio decoder 212 includes a reference clock 402 and an audio clock 404, and a video decoder 214 includes a reference clock 402 and a video clock 406. Also or alternatively, some decoders 212, 214 may have one or more reference clock(s) 402, one or more audio clock(s) 404 and/or one or more video clock(s) 406. The reference clock(s) 402, audio clock(s) 404 and video clock(s) 406 may be external or internal to decoders 212, 214.

The clocks 402, 404, and 406 may be used to maintain synchronization of video and audio playback, and control when video and audio are output to the display device 106 for display to users. In some embodiments, for playback of a given content 124, the audio clock 404 maintains a program time stamp (PTS) of the audio, and the video clock 406 maintains a PTS of the video. Referring to FIG. 3, when the audio PTS—that is, when the audio clock 404 associated with the audio PTS—is equal to the reference clock 402, then the decoded audio in the stream 308 is provided to the display device 106 for playback to users. Similarly, when the video PTS—that is, when the video clock 406 associated with the video PTS—is equal to the reference clock 402, then the decoded video in the stream 308 is provided to the display device 106 for playback to users.

Reducing Discontinuities when Stitching Second Content into First Content

Figure 5:
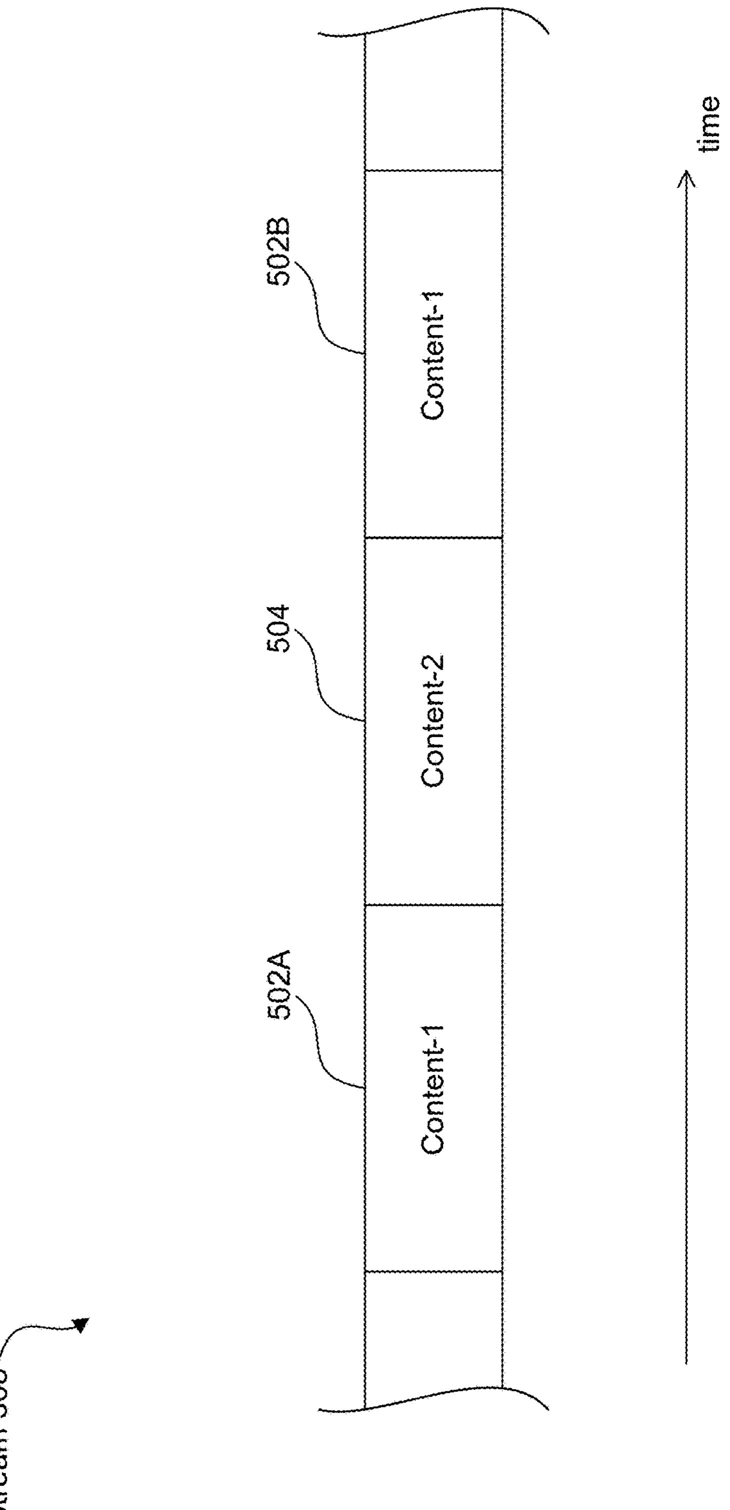
FIG. 5 illustrates an example where content-2 is being stitched into a stream of content-1, according to some embodiments.

In some embodiments, secondary (or more generally, second) content may be stitched into the viewing of primary (or more generally, first) content. For example, while a user is watching a movie (i.e., the primary content) using his media device 108 and associated display device 106, the primary content may be momentarily suspended and a clip about, for example, future programming or a public service announcement (i.e., the secondary content) may be displayed. In other words, the secondary content is stitched into the streaming of the primary content. This is illustrated in FIG. 5 that shows an example stream 308 that is being provided to display device 106 for playback. In the example stream 308 of FIG. 5, content-2 504 (representing the secondary content) is stitched into the stream of content-1 502 (representing the primary content). In a non-limiting example, the primary content can be a movie or TV show, and the secondary content can be a future programming message, public service or community service announcement, information issued by the government, advertisement, weather information, local device information (such as information relating to network 120, media device 108, and/or display device 106), etc.

Stitching as just described may result in technical problems. For example, the audio and/or video format of the primary content may differ from the secondary content. The resulting need to switch audio decoders 212 and/or video decoders 214 to process the different audio and/or video format of the secondary content may result in discontinuities in the playback of the secondary content (such as an extended blank screen or audio mute, for example). Similar discontinuities may result when playback of the primary content resumes. Such discontinuities may degrade the user's viewing experience.

Figure 6:
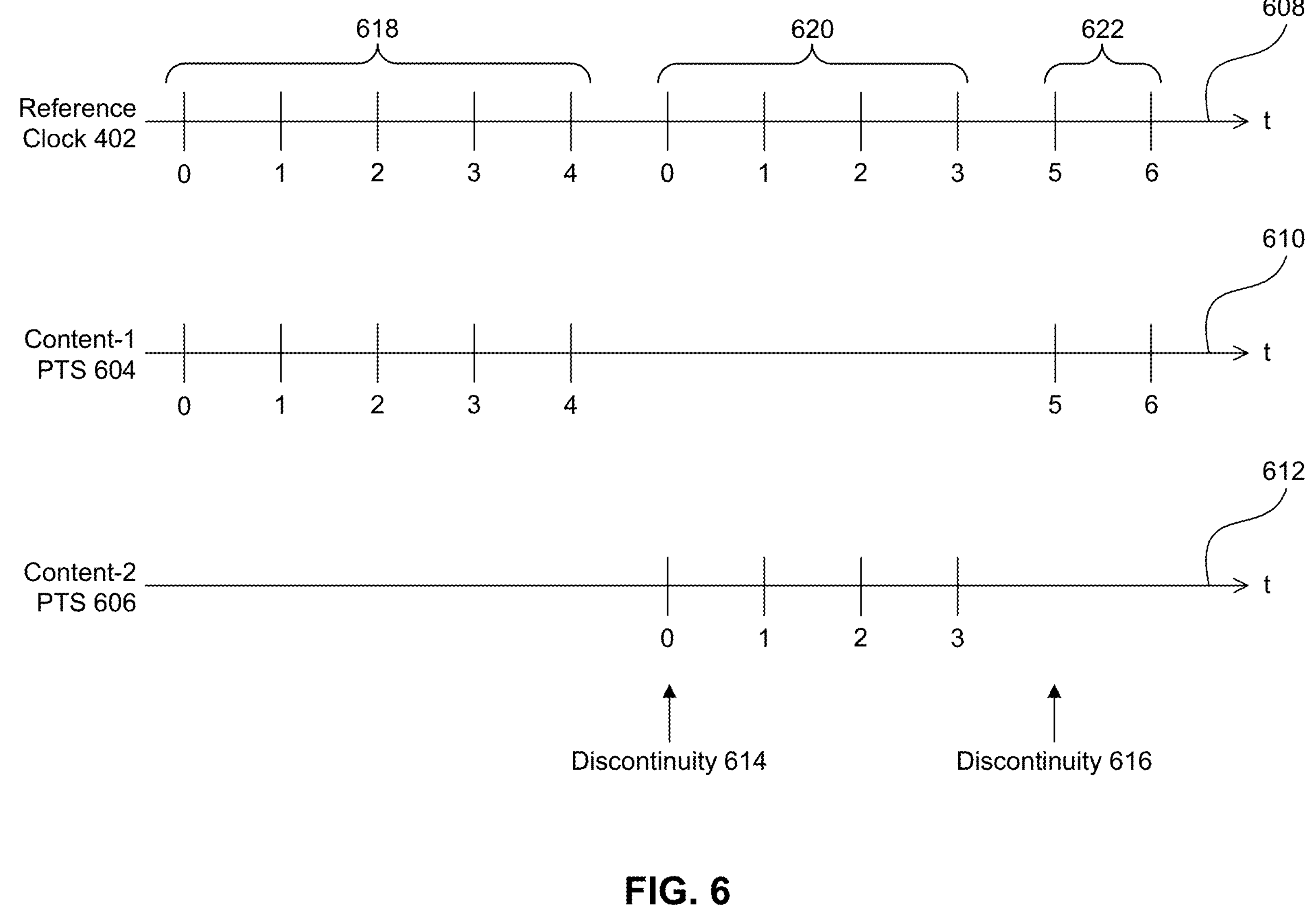
FIG. 6 illustrates example clocks associated with a decoder for the stream of FIG. 5, according to some embodiments.

Such technical problems exist in some stitching embodiments, an example of which is shown in FIG. 6, which corresponds to the example stream 308 of FIG. 5. Assume that during 618, content-1 502A in stream 308 of FIG. 5 is scheduled to be displayed on display device 106. Assume also that during 620, content-2 504 is scheduled to be displayed (that is, content-2 504 is to be stitched into the stream of content-1 502), and then during 622, playback of content-1 502B resumes.

In the example of FIG. 6, content-1 PTS 604 corresponds to the audio PTS and video PTS of content-1 502 (here, it is assumed the audio PTS is equal to the video PTS). Accordingly, the example of FIG. 6 configures the reference clock 402 to be equal to the content-1 PTS 604 during 618 and 622, to thereby cause content-1 502A and 502B to be displayed on the display device 106 during these time periods 618 and 622. This is indicated by the reference clock 402 and content-1 PTS 604 moving in lock-step from 0 to 4 during 618, and then 5-6 during 622.

Similarly, in the example of FIG. 6, content-2 PTS 606 corresponds to the audio PTS and video PTS of content-2 504. Accordingly, this approach configures the reference clock 402 to be equal to the content-2 PTS 604 during 620, to thereby cause content-2 504 to be displayed on the display device 106 during time period 620. This is indicated by the reference clock 402 and content-2 PTS 606 moving in lock-step from 0 to 3 during 620.

In the example approach of FIG. 6, the stitching of content-2 504 into content-1 502 causes discontinuities 614, 618 in the reference clock 402. The first discontinuity 614 occurs at the start of 620 when content-2 504 is stitched in. The second discontinuity 616 occurs at the start of 622 when playback of content-1 502B resumes. The discontinuities 614, 616 are caused by the reference clock 402 being reset to 0 at the beginning of 620, and then being set to 5 at the beginning of 622.

In the example of FIG. 6, and referring to FIG. 3, such changes in the reference clock 402 are associated with the media device 108 closing the audio decoder 212 and the video decoder 214 that are currently being used to decode the audio and video streams 304, 306, respectively, such that the stream 308 to the display device 106 is interrupted. Such interruption causes the video display to freeze or go blank, and the audio to mute. During the interruption, the media device 108 switches to an audio decoder 212 and video decoder 214 which are compatible with the audio and video format of content-2 504. Once the switch is complete and the newly selected audio decoder 212 and video decoder 214 begin operating, the stream 308 to the display device 106 may resume.

In the example approach of FIG. 6, such interruptions occur even when the audio format and/or video format of content-2 504 is the same as the audio format and/or video format of content-1 502. In such cases when the formats are the same, there is no need to switch decoders 212, 214 so the interruption (that is, the blank/frozen display and muted audio) are not necessary and needlessly degrade the user's viewing experience.

Figure 7:
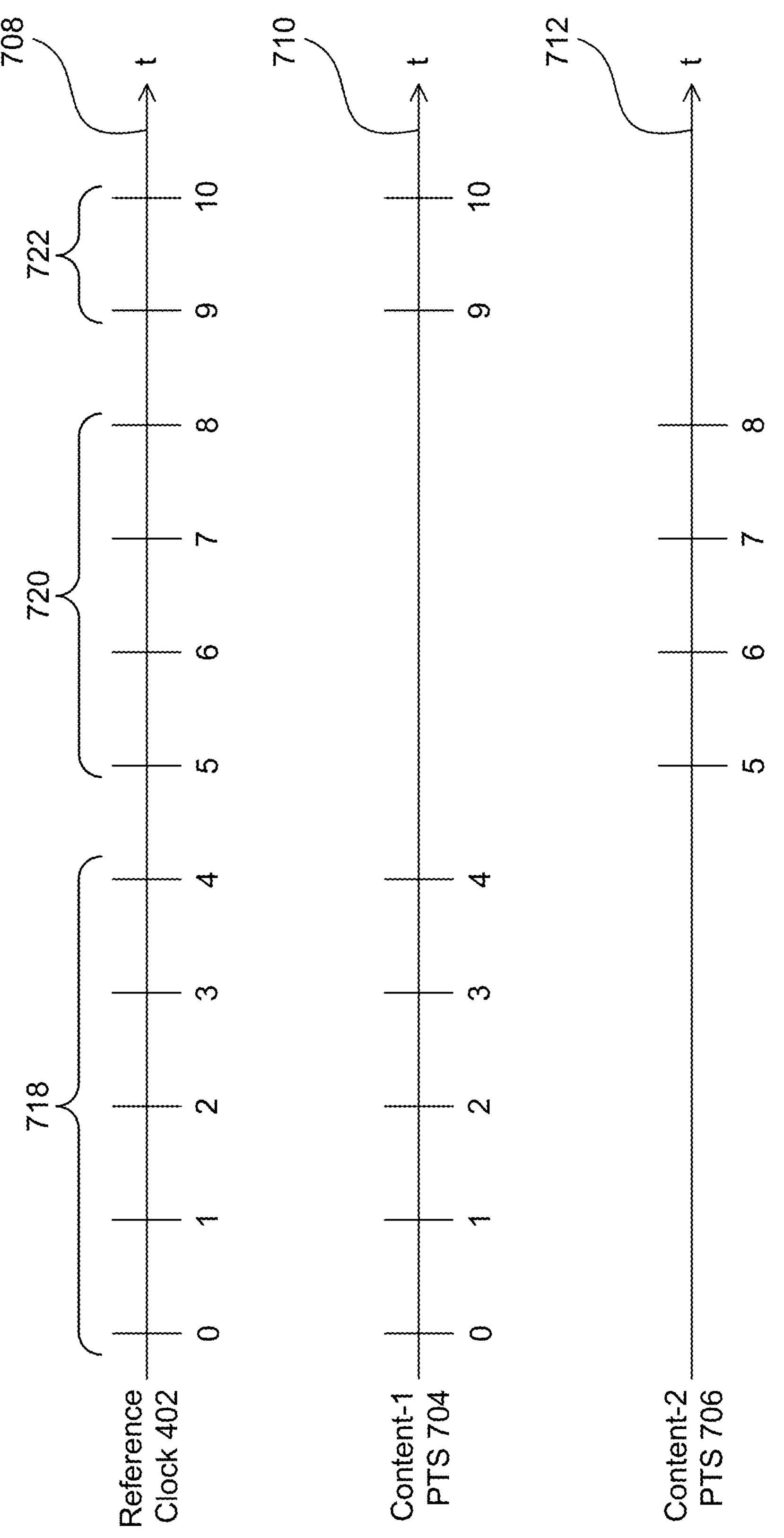
FIG. 7 illustrates example clocks associated with a decoder for the stream of FIG. 5, according to other embodiments.

Certain embodiments of this disclosure reduce and even eliminate such discontinuities 614, 616 and interruptions so as to avoid frozen/blank screens and muted audio (as well as any other artifacts of the discontinuities 614, 616), thereby enhancing the user's viewing experience. An advantage of these embodiments is they are achieved client side (that is, at the media device 108), so there is no latency from the content servers 122 or network 120. FIG. 7 illustrates an example of such operation, according to some embodiments.

In particular, FIG. 7 corresponds to the example stream 308 of FIG. 5, such that during 718, content-1 502A in stream 308 is scheduled to be displayed on display device 106. During 720, content-2 504 is scheduled to be displayed (that is, content-2 504 is to be stitched into the stream of content-1 502), and then during 722, playback of content-1 502B is scheduled to resume.

Content-1 PTS 704 corresponds to the audio PTS and video PTS of content-1 502, and content-2 PTS 706 corresponds to the audio PTS and video PTS of content-2 504. In the example of FIG. 7, for illustrative purposes, it is assumed that the audio PTS and video PTS of content-1 502 are the same, and the audio PTS and video PTS of content-2 504 are the same (however, generally this is not always the case, as described below).

According to embodiments represented by FIG. 7, when content-2 504 is stitched into content-1 502 at 720, the content-2 PTS 706 does not reset to zero. Instead, the numbering of content-2 PTS 706 is configured to continue from the numbering of content-1 PTS 704. Also, when play of content-1 502B is resumed at 722, the numbering of content-1 PTS 704 does not continue from the prior numbering of content-1 PTS 704 from 718. Instead, the numbering of content-1 PTS 704 is configured to continue from the numbering of content-2 PTS 706.

In this manner, the numbering of content-1 PTS 704 and content-2 PTS 706 is consecutive during time periods 718, 720, 722, from 0 to 10. Correspondingly, the numbering of the reference clock 402 is also consecutive during time periods 718, 720, 722, from 0 to 10. In other words, there are no resets or non-consecutive jumps in the numbering of the reference clock 402.

Because the numbering of the reference clock 402 is consecutive, the media device 108 does not switch the audio decoder 212 or the video decoder 214 when content-2 504 is stitched into the stream 308 during 720, or when play of content-1 502B resumes in 722. Since the audio decoder 212 and the video decoder 214 are not switched, there are no discontinuities 614, 616 or interruptions in the stream 308 to the display device 106 (see FIG. 3). As a result, the user's viewing experience is enhanced.

It is noted that the example scenario of FIG. 7 applies only when the audio and video formats of content-1 502 match that of content-2 504. Embodiments of this disclosure leverage those times when they do match to avoid discontinuities 614, 616 or interruptions in the stream 308 to the display device 106. Thus, this is an improvement upon the approach of FIG. 6, that suffers from discontinuities 614, 616 and interruptions even when the audio and video formats of content-1 502 match that of content-2 504.

Figure 8:
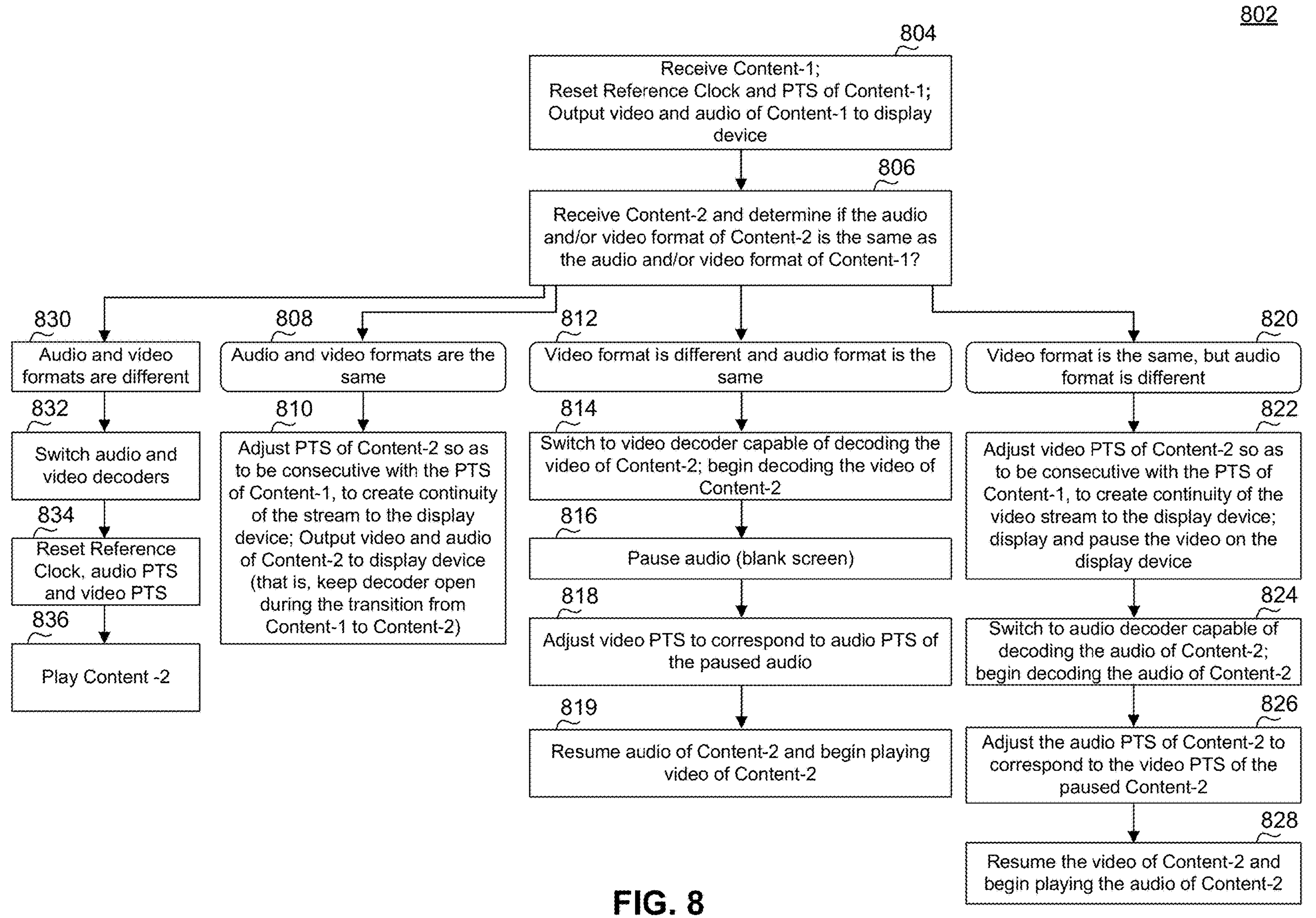
FIG. 8 is a flowchart for stitching second content into a stream of first content, where the audio and/or video format of the first content may differ from the second content, according to some embodiments.

FIG. 8 is a flowchart of a method 802 for stitching second content into a stream of first content, wherein the audio and/or video format of the first content may differ from the second content, that reduces or eliminates discontinuities 614, 616 and interruptions in a stream 308 being displayed by a display device 106, according to some embodiments. Method 802 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 802 shall be described with reference to FIGS. 1, 3, 4, 5 and 7. However, method 802 is not limited to those example embodiments.

In 804, to begin displaying content-1 502A, the media device 108 may reset the reference clock 402 to 0, and may also reset the content-1 PTS 704 (both audio and video) to 0. This is shown at the beginning of time period 718 in FIG. 7. Content-1 502A in stream 308 may then be displayed on the display device 106.

In 806, the media device 108 may receive content-2 504 for stitching into the stream 308. The media device 108 may also receive metadata 126 associated with content-2 504. The metadata 126 may include information identifying the audio format and video format of content-2 504. The media device 108 may use the received metadata 126 to determine if the audio format and/or video format of content-2 504 are the same or different from the audio format and/or video format of the content that is currently being streamed (that is, content-1 502A in the example of FIG. 5).

If both the audio and video formats are different (as indicated by 830), then in 832, the media device 108 may change the audio decoder 212 to one that supports the audio format of content-2 504. Also, the media device 108 may change the video decoder 214 to one that supports the video format of content-2 504. Switching the audio decoder 212 and the video decoder 214 may cause a blank or frozen screen and audio mute at the display device 106.

In 834, the media device 108 may reset the reference clock 402 and the content-2 PTS 706 (both audio and video) to 0. The media device 108 may reset the content-2 PTS 706 (both audio and video) by resetting the audio clock 404 and video clock 406 associated with the audio and video decoders 212, 214 that were switched to in 832.

In 836, the media device 108 may cause content-2 504 to be played in the display device 106.

Returning to 806, if both the audio and video formats are the same (as indicated by 808), then in 810, the media device 108 may adjust the content-2 PTS 706 to be consecutive with the content-1 PTS 704. This case is the situation shown in FIG. 7, where the content-2 PTS 706 in time period 720 (5-8) is consecutive from the content-1 PTS 704 in time period 718 (0-4). Correspondingly, the reference clock 402 is also consecutive during time periods 718, 720 (0-8). As a result, the stitching of content-2 504 is continuous with content-1 502A in the stream 308, so there are not discontinuities 614, 616 or interruptions in the steam 308 to the display device 106.

Returning to 806, if the video format is the same, but the audio format is different (as indicated by 820), then in 822, the media device 108 may adjust the video content-2 PTS 706 so it is consecutive with the video content-1 PTS 704, to thereby create continuity in the video stream to the display device 108. Then, the media device 108 may display the video of content-2 504 on the display device 106, but pause such video display on the display device 106 pending performance of steps 824 and 826.

In 824, the media device 108 may change the audio decoder 212 to one that supports the audio format of content-2 504. During this change, audio may mute on the display device 106. This new audio decoder 212 may begin to decode the audio bit stream 304 of content-2 504.

In 826, the media device 108 may change the audio content-2 PTS 706 to be the same as the video content-2 PTS 706 of the video paused in 822. This results in synchronizing the playback of the audio and video of content-2 504.

In 828, the media device 108 may resume playing the video of content-2 504, and begin playing the audio of content-2 504, on the display device 106. Since the audio content-2 PTS 706 was set to be the same value as the video content-2 PTS 706 in 826, playback of the audio and video of content-2 504 is in synch.

Returning to 806, if the video format is different, but the audio format is the same (as indicated by 812), then in 814, the media device 108 may change the video decoder 214 to one that supports the video format of content-2 504. During this change, video may freeze or blank on the display device 106. This new video decoder 214 may begin to decode the video bit stream 306 of content-2 504.

In 816, the media device 108 may cause the audio to pause (that is, mute) on the display device 106.

In 818, the media device 108 may adjust the video content-2 PTS 706 so it is the same as the audio content-2 PTS 706. This results in synchronizing the playback of the audio and video of content-2 504.

In 819, the media device 108 may resume playing the audio of content-2 504, and begin playing the video of content-2 504, on the display device 106. Since the video content-2 PTS 706 was set to be the same value as the audio content-2 PTS 706 in 818, playback of the audio and video of content-2 504 is in synch.

Client-Side Stitching at Scene Change Boundaries

In some embodiments, stitching second content into a stream of first content occurs at scene change boundaries of the first content, using a single audio/video decoder or multiple audio/video decoders. Such operation is illustrated in an example 902 of FIG. 9. In this example 902, content-2 504 is being stitched into a stream 308 of content-1 502.

A timeline 903 illustrates inline frames (I-frames) or, alternatively, instantaneous decoder refresh frames (IDR-frames). In some embodiments, stitching occurs at the beginning of I-frames (or IDR-frames). Thus, in such embodiments, content-2 504 would begin playing at an I-frame, and content-1 502B would resume playing at a subsequent I-frame.

But I-frames and IDR-frames do not align with scene change boundaries, unless by happenstance. As a result, stitching at non-scene change I-frames and IDR-frames may detract from a user's viewing experience.

Certain embodiments of this disclosure solve this technical problem by stitching at scene change boundaries. Such embodiments operate by identifying an I-frame (or IDR-frame) close or closest to the next scene change 906. Then, content-1 308 is played on the display device 106 until the identified I-frame plus X, where X is the distance in time from the identified I-frame to the next scene change 906. At that point in the timeline 903—that is, at the scene change 906—content-2 504 is stitched into the stream 308 for display on the display device 106.

The foregoing is the case when the identified I-frame occurs in the timeline 903 prior to the next scene change 906. If instead the identified I-frame occurs in the timeline 903 after the next scene change 906, then content-1 308 is played on the display device 106 until the identified I-frame minus Y, where Y is the distance in time from the identified I-frame to the next scene change 906. At that point in the timeline 903—that is, at the scene change 906—content-2 504 is stitched into the stream 308 for display on the display device 106.

Figure 9:
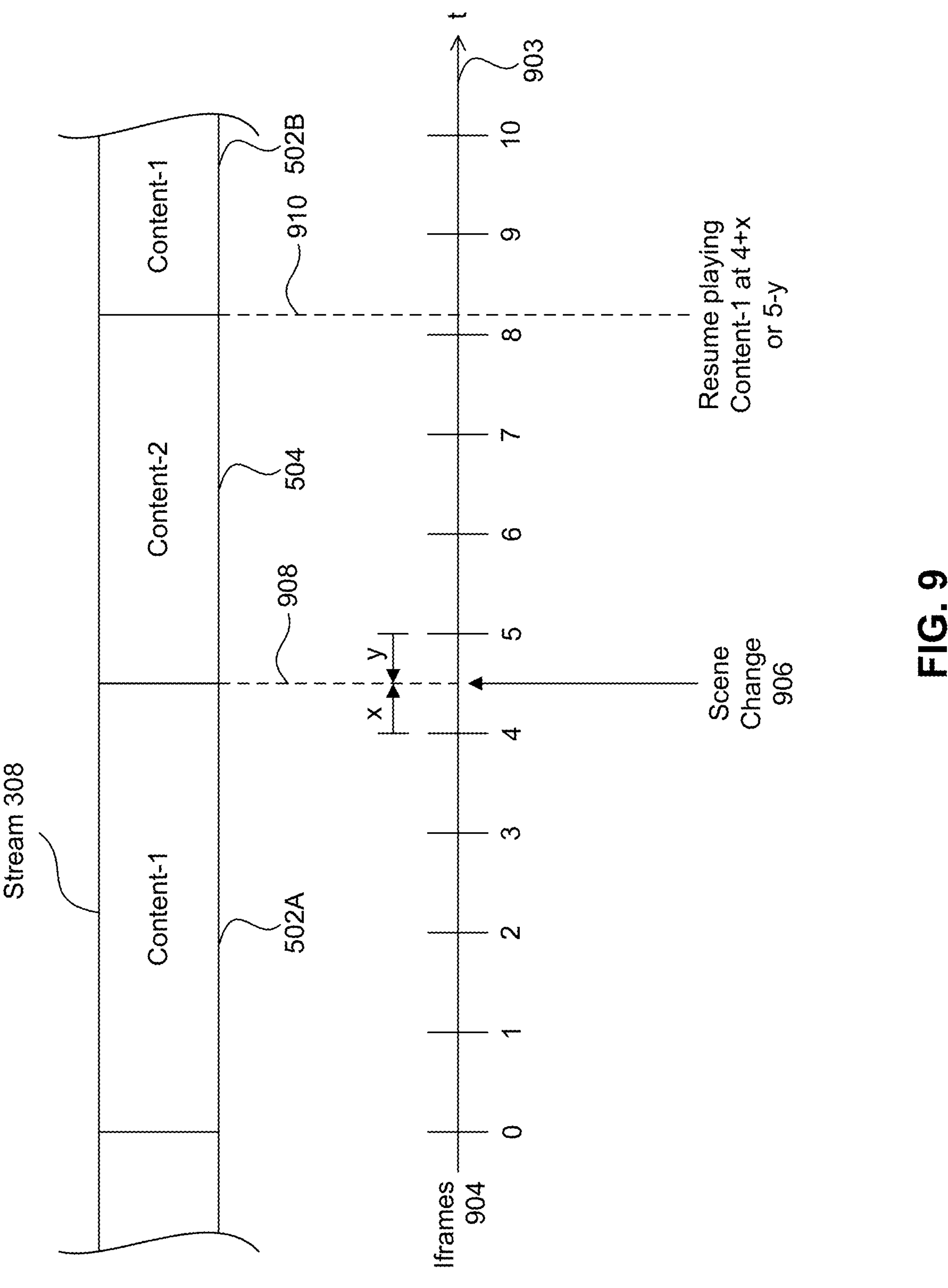
FIG. 9 illustrates an example where content-2 is being stitched into a stream of content-1, where the stitching occurs at scene change boundaries of content-1, according to some embodiments.

In the example of FIG. 9, when content-2 ends, display of content-1 502B resumes at 4+X or 5−Y (whichever the case may be) in the timeline of content-1 502.

Figure 10:
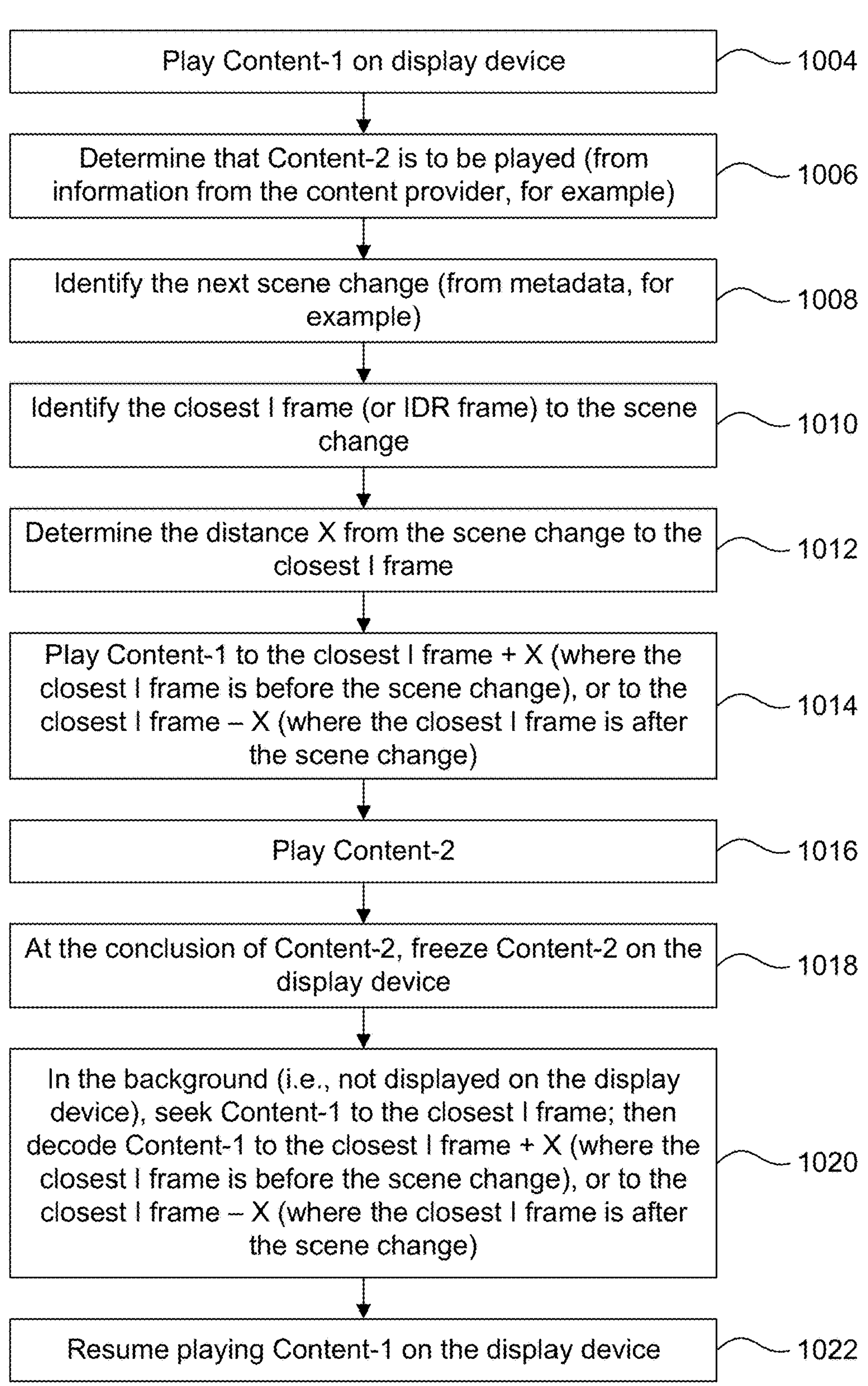
FIG. 10 is a flowchart for stitching second content into a stream of first content, such that the stitching occurs at scene change boundaries of the first content, using a single audio/video decoder, according to some embodiments.

FIG. 10 is a flowchart of a method 1002 for stitching second content into a stream of first content, such that the stitching occurs at scene change boundaries of the first content, using a single audio/video decoder, according to some embodiments. Method 1002 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1002 shall be described with reference to FIGS. 1, 3, and 9. However, method 1002 is not limited to those example embodiments.

In 1002, the media device 108 may play content-1 502A on the display device 106.

In 1004, the media device 108 may determine that content-2 504 should be played (that is, stitched in) at or around a particular point in the timeline 903. Such programming and scheduling information may be included in metadata 126 that the media device 108 receives from the content server 122 who is providing content-1 502 and/or content-2 504.

In 1008, the media device 108 may identify the scene change in the content currently being displayed (that is, content-1 502A) at or proximate to the point in the timeline 903 where content-2 504 is to be stitched in. The media device 108 may perform 1008 using the metadata 126 associated with content-1 502, where such metadata 126 may include information identifying scene changes in content-1 502. In some embodiments, the media device 108 instead operates to identify the next scene change in content-1 502A.

In 1010, the media device 108 may identify an I-frame close or closest in the timeline 903 to the scene change in content-1 502A identified in 1008.

In 1012, the media device 108 may identify X, which is the distance in time from the identified I-frame (or IDR-frame) to the identified scene change.

In 1014, the media device 108 may play content-1 502A to the identified I-frame plus X (when the identified I-frame is before the identified scene change in the timeline 903), or to the identified I-frame minus X (when the identified I-frame is after the identified scene change in the timeline 903). In other words, the media device 108 plays content-1 502A to the scene change in content-1 502A identified in 1008.

In 1016, the media device 108 may play content-2 504, beginning at that scene change in content-1 502A.

In 1018, at the conclusion of content-2 504, the media device 108 may pause (that is, freeze) the display of content-2 504 on the display device 106. Such pausing provides time for the performance of step 1020.

In 1020, the media device 108 may seek content-1 502A to the I-frame identified in step 1010. Then, the media device 108 may cause the decoder 212/214 to decode content-1 502A to the identified I-frame plus X (when the identified I-frame is before the identified scene change in the timeline 903), or to the identified I-frame minus X (when the identified I-frame is after the identified scene change in the timeline 903). In other words, the media device 108 decodes to the point in content-1 502A where the stitching of content-2 504 occurred.

In 1022, the media 108 may resume playing content-1 502B on the display device 106, at the point in content-1 502A where the stitching of content-2 504 occurred.

It is noted that method 1002 operates with a single decoder 212/214 (that is, a single audio decoder 212 and a single video decoder 214). Because only a single decoder 212/214 is used, it is necessary to pause the display on the display device 106 (in step 1018) until the content-1 502A can be decoded to the scene change 906 where stitching of content-2 504 occurred (in step 1020). If, instead, multiple decoders 212/214 are used, then such pausing would not be necessary.

Figure 11:
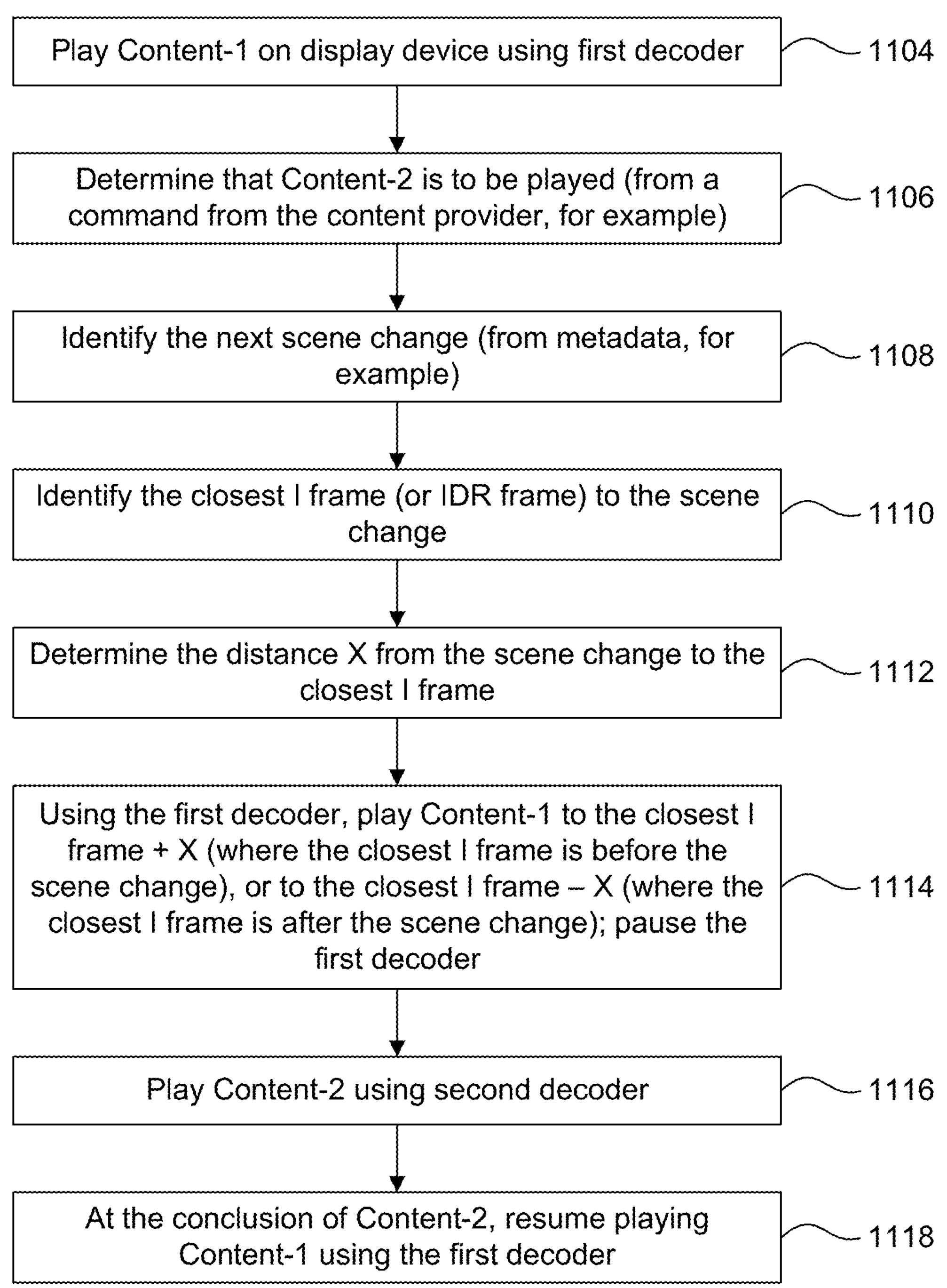
FIG. 11 is a flowchart for stitching second content into a stream of first content, such that the stitching occurs at scene change boundaries of the first content, using multiple audio/video decoders, according to some embodiments.

Accordingly, FIG. 11 is a flowchart 1102 for stitching second content into a stream of first content, such that the stitching occurs at scene change boundaries of the first content, using multiple audio/video decoders, according to some embodiments. Method 1102 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art. Method 1102 shall be described with reference to FIGS. 1, 3, and 9. However, method 1102 is not limited to those example embodiments.

In 1104, the media device 108 may use a first decoder 212/214 (that is, a first audio decoder 212 and a first video decoder 214) to decode content-1 502A, and then play the decoded content-1 502A on the display device 106.

In 1106, the media device 108 may determine that content-2 504 should be played (that is, stitched in) at or around a particular point in the timeline 903 of content-1 502A. As discussed above, such programming and scheduling information may be included in metadata 126 that the media device 108 receives from the content server 122 who is providing content-1 502 and/or content-2 504.

In 1108, the media device 108 may identify the scene change in the content currently being displayed (that is, content-1 502A) at or proximate to the point in the timeline 903 where content-2 504 is to be stitched in. The media device 108 may perform 1108 using the metadata 126 associated with content-1 502, where such metadata 126 may include information identifying scene changes in content-1 502. In some embodiments, the media device 108 instead operates to identify the next scene change in content-1 502A.

In 1110, the media device 108 may identify an I-frame close or closest in the timeline 903 to the scene change in content-1 502A identified in 1108.

In 1112, the media device 108 may identify X, which is the distance in time from the identified I-frame (or IDR-frame) to the identified scene change.

In 1114, the media device 108 may use the first decoder 212/214 to decode and play content-1 502A to the identified I-frame plus X (when the identified I-frame is before the identified scene change in the timeline 903), or to the identified I-frame minus X (when the identified I-frame is after the identified scene change in the timeline 903). In other words, the media device 108 uses the first decoder 212/214 to decode and play content-1 502A to the scene change in content-1 502A identified in 1108. At that point, operation of the first decoder 212/214 is paused or the decoded data is buffered.

In 1114, the media device 108 may use a second decoder 212/214 (that is, a second audio decoder 212 and a second video decoder 214) to decode content-2 504, and then play the decoded content-2 504 on the display device 106 beginning at that scene change in content-1 502A.

In 1114, at the conclusion of content-2 504, the media device 108 may use the first decoder 212/214 to resume decoding and playing content-1 502B, from the point last played in step 1114.

Example Computer System

Figure 12:
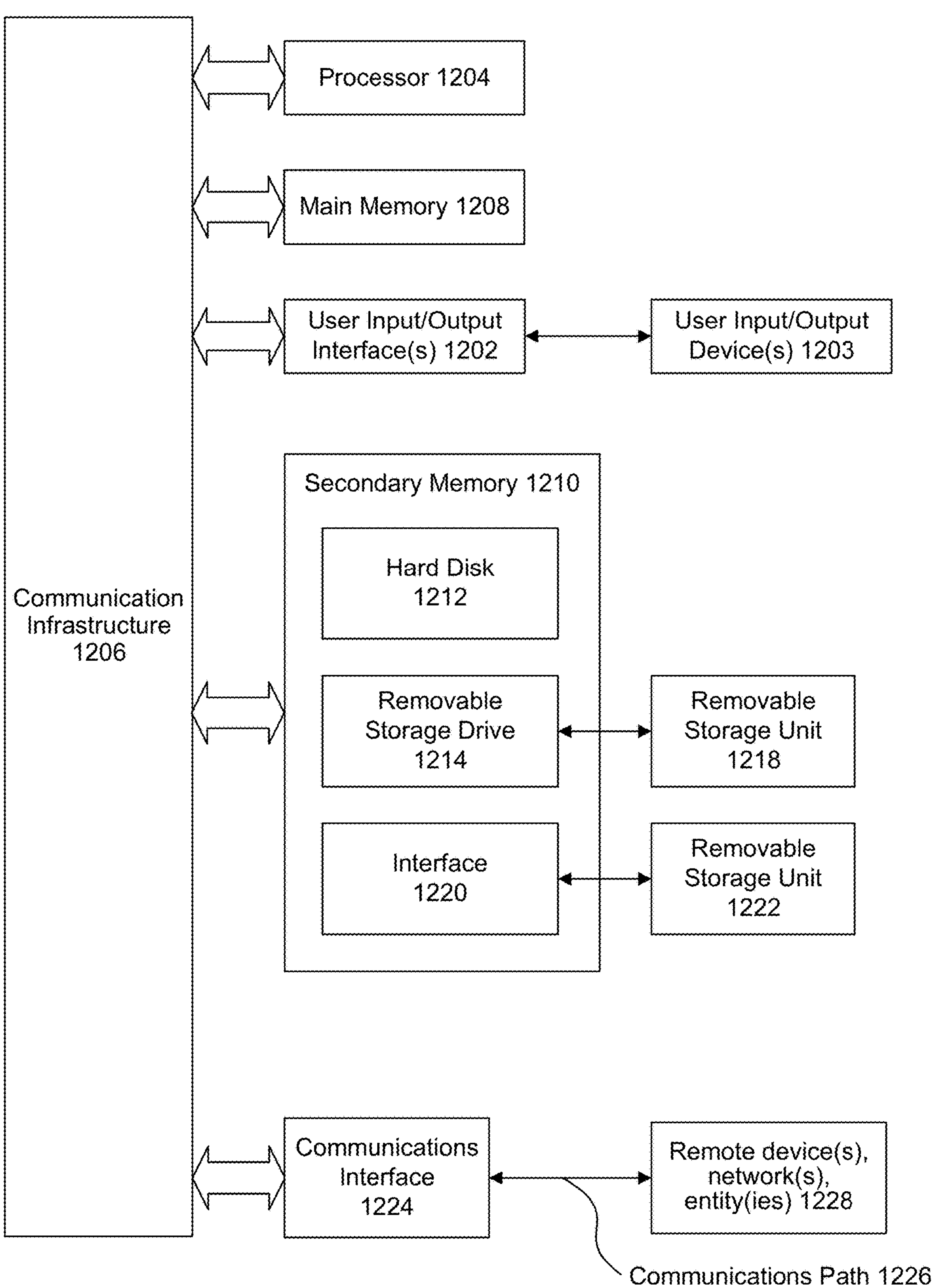
FIG. 12 illustrates an example computer system useful for implementing various embodiments.

Various embodiments and/or components therein can be implemented, for example, using one or more computer systems, such as computer system 1200 shown in FIG. 12. Computer system 1200 can be any computer or computing device capable of performing the functions described herein. For example, one or more computer systems 1200 can be used to implement any embodiments of FIGS. 1-11, and/or any combination or sub-combination thereof.

Computer system 1200 includes one or more processors (also called central processing units, or CPUs), such as a processor 1204. Processor 1204 is connected to a communication infrastructure or bus 1206.

One or more processors 1204 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 can include one or more levels of cache.

Main memory 1208 has stored therein control logic (i.e., computer software) and/or data.

Computer system 1200 can also include one or more secondary storage devices or memory 1210. Secondary memory 1210 can include, for example, a hard disk drive 1212 and/or a removable storage device or drive 1214. Removable storage drive 1214 can be a floppy disk drive, a magnetic tape drive, a compact disk drive, an optical storage device, tape backup device, and/or any other storage device/drive.

Removable storage drive 1214 can interact with a removable storage unit 1218. Removable storage unit 1218 includes a computer usable or readable storage device having stored thereon computer software (control logic) and/or data. Removable storage unit 1218 can be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 can include other means, instrumentalities or other approaches for allowing computer programs and/or other instructions and/or data to be accessed by computer system 1200. Such means, instrumentalities or other approaches can include, for example, a removable storage unit 1222 and an interface 1220. Examples of the removable storage unit 1222 and the interface 1220 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 can further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 can allow computer system 1200 to communicate with remote devices 1228 over communications path 1226, which can be wired and/or wireless, and which can include any combination of LANs, WANs, the Internet, etc. Control logic and/or data can be transmitted to and from computer system 1200 via communication path 1226.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

providing, by at least one computer processor, first content for display on a display device;

identifying a point in a timeline of the first content when second content is to be displayed in lieu of the first content;

identifying a scene change in the first content closest to the point in the timeline wherein the scene change is different from the point in the timeline;

identifying a first frame having a distance X prior to the scene change;

providing the first content for display on the display device to the identified first frame plus the distance X;

providing the second content for display on the display device beginning at the scene change;

at a conclusion of the second content, pausing display on the display device;

in response to pausing the display, seeking and decoding the first content to the scene change by decoding the first content to the identified first frame plus the distance X, wherein the decoding of the first content commences from the scene change, and wherein the seeking and decoding of the first content occurs in a background process; and providing the decoded first content, from the scene change, to the display device for display.

2. The computer-implemented method of claim 1, wherein the identified first frame is an I-frame or an IDR-frame.

3. The computer-implemented method of claim 1, wherein the seeking and decoding the first content to the scene change comprises:

seeking the first content to the identified first frame; and decoding the first content to the identified first frame plus X.

4. The computer-implemented method of claim 1, further comprising:

determining the scene change based on metadata corresponding to the first content.

5. The computer-implemented method of claim 1, wherein the pausing the display further comprises buffering the decoded first content.

6. The computer-implemented method of claim 1, further comprising:

identifying a second point in the timeline of the first content when third content is to be displayed in lieu of the first content;

identifying a second scene change in the first content closest to the second point;

identifying a second frame having a distance Y after the second scene change; and providing the first content for display on the display device to the identified second frame minus the distance Y.

7. The computer-implemented method of claim 6, further comprising:

providing the third content for display on the display device beginning at the second scene change;

at a conclusion of the third content, pausing display on the display device;

decoding the first content to the second scene change; and providing the decoded first content from the second scene change to the display device for display.

8. The computer-implemented method of claim 7, wherein the providing the decoded first content from the second scene change further comprises:

playing the decoded first content on the display device to the identified second frame minus the distance Y, wherein the identified second frame is after the second scene change.

9. A system, comprising:

a memory; and at least one processor coupled to the memory and configured to perform operations comprising:

providing first content for display on a display device;

identifying a point in a timeline of the first content when second content is to be displayed in lieu of the first content;

identifying a scene change in the first content closest to the point in the timeline wherein the identified scene change is different from the point in the timeline;

identifying a first frame having a distance X prior to the scene change;

providing the first content for display on the display device to the identified first frame plus the distance X;

providing the second content for display on the display device beginning at the scene change;

at a conclusion of the second content, pausing display on the display device;

in response to pausing the display, seeking and decoding the first content to the scene change by decoding the first content to the identified first frame plus the distance X, wherein the decoding of the first content commences from the scene change, and wherein the seeking and decoding of the first content occurs in a background process; and providing the decoded first content, from the scene change, to the display device for display.

10. The system of claim 9, wherein the identified first frame is an I-frame or an IDR-frame.

11. The system of claim 9, wherein the seeking and decoding the first content to the scene change comprises:

seeking the first content to the identified first frame; and decoding the first content to the identified first frame plus X.

12. The system of claim 9, the operations further comprising:

determining the scene change based on metadata corresponding to the first content.

13. The system of claim 9, wherein the pausing the display further comprises buffering the decoded first content.

14. The system of claim 9, wherein the operations further comprise:

identifying a second point in the timeline of the first content when third content is to be displayed in lieu of the first content;

identifying a second scene change in the first content closest to the second point;

identifying a second frame having a distance Y after the second scene change; and providing the first content for display on the display device to the identified second frame minus the distance Y.

15. The system of claim 14, wherein the operations further comprise:

providing the third content for display on the display device beginning at the second scene change;

at a conclusion of the third content, pausing display on the display device;

decoding the first content to the second scene change; and providing the decoded first content from the second scene change to the display device for display.

16. The system of claim 15, wherein the providing the decoded first content from the second scene change further comprises:

playing the decoded first content on the display device to the identified second frame minus the distance Y, wherein the identified second frame is after the second scene change.

17. A non-transitory computer-readable medium having instructions stored thereon that, when executed by at least one computing device, cause the at least one computing device to perform operations comprising:

providing, by at least one computer processor, first content for display on a display device;

identifying a point in a timeline of the first content when second content is to be displayed in lieu of the first content;

identifying a scene change in the first content closest to the point in the timeline wherein the identified scene change is different from the point in the timeline;

identifying a first frame having a distance X prior to the scene change;

providing the first content for display on the display device to the identified first frame plus the distance X;

providing the second content for display on the display device beginning at the scene change;

at a conclusion of the second content, pausing display on the display device;

in response to pausing the display, seeking and decoding the first content to the scene change by decoding the first content to the identified first frame plus the distance X, wherein the decoding of the first content commences from the scene change, and wherein the seeking and decoding of the first content occurs in a background process; and providing the decoded first content, from the scene change, to the display device for display.

18. The non-transitory computer-readable medium of claim 17, wherein the identified first frame is an I-frame or an IDR-frame.

19. The non-transitory computer-readable medium of claim 17, wherein the operations further comprise:

identifying a second point in the timeline of the first content when third content is to be displayed in lieu of the first content; and identifying a second scene change in the first content closest to the second point;

identifying a second frame having a distance Y after the second scene change; and providing the first content for display on the display device to the identified second frame minus the distance Y.

20. The non-transitory computer-readable medium of claim 19, wherein the operations further comprise:

providing the third content for display on the display device beginning at the second scene change; and at a conclusion of the third content, pausing display on the display device;

decoding the first content to the second scene change; and providing the decoded first content from the second scene change to the display device for display.

* * * * *